US009307517B2

(12) United States Patent
Alavudin

(10) Patent No.: US 9,307,517 B2
(45) Date of Patent: Apr. 5, 2016

(54) SYSTEMS AND METHODS FOR LOCATION-BASED MULTI-BAND ROAMING

(71) Applicant: Jalvathi Alavudin, Bangalore (IN)

(72) Inventor: Jalvathi Alavudin, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/223,179

(22) Filed: Mar. 24, 2014

(65) Prior Publication Data

US 2015/0271779 A1    Sep. 24, 2015

(51) Int. Cl.
*H04W 64/00*    (2009.01)
*H04W 76/02*    (2009.01)

(52) U.S. Cl.
CPC .......... *H04W 64/003* (2013.01); *H04W 76/021* (2013.01)

(58) Field of Classification Search
CPC ... H04W 64/00; H04W 64/003; H04W 4/025; H04W 76/02; H04W 84/12; H04W 12/06; H04W 48/10; H04W 48/20; H04W 4/008; H04W 88/08; H04W 8/005; H04L 67/18; H04L 5/0055; H04L 65/80; H04L 67/04
USPC ...................................................... 455/456.1
See application file for complete search history.

(56) References Cited

U.S. PATENT DOCUMENTS

| 2009/0109921 | A1* | 4/2009 | Bowen .................. H04W 36/24 370/331 |
| 2009/0278705 | A1* | 11/2009 | Chhabra et al. .......... 340/825.49 |
| 2014/0335823 | A1* | 11/2014 | Heredia et al. ................ 455/411 |

* cited by examiner

*Primary Examiner* — Kwasi Karikari
(74) *Attorney, Agent, or Firm* — Sutherland Asbill & Brennan LLP

(57) ABSTRACT

Systems and methods to provide connectivity by a user device to a WiFi network based at least in part on determining the location of the user device are disclosed. The user device may determine its current location and send a location message indicating its current location to a mobile network server via a mobile communication network. The mobile network server may determine if there are available WiFi access points at the current location of the user device. If the mobile network server determines that there is an available WiFi access point to which the user device may connect at its current location, then the mobile network server may communicate association information of that WiFi network to the user device. The user device may receive the association information and connect to the available WiFi access point using the association information. The user device may turn on its WiFi radio prior to connecting to the WiFi access point. Once connected, the user device may seamlessly transition any applications running thereon to use communications bandwidth from the WiFi network from using communications bandwidth of the mobile communications network.

21 Claims, 6 Drawing Sheets

US 9,307,517 B2

SYSTEMS AND METHODS FOR LOCATION-BASED MULTI-BAND ROAMING

TECHNICAL FIELD

This disclosure generally relates to systems and methods for multi-band roaming, and more particularly location-based multiband roaming.

BACKGROUND

Often times, congested locations, such as major metropolitan locations may be constrained with regards to available mobile communications bandwidth density. Particularly with the use of data intensive applications, consumer demand for communications bandwidth on global system of mobile (GSM), code division multiple access (CDMA), Long term Evolution (LTE), WiMax, 4G, 3G, or other mobile communications networks, may be great enough in high population density areas to tax capabilities of the communications infrastructure.

Many urban setting have a relatively high number of WiFi access points (APs) or hotspots. In many cases, the data and/or communications bandwidth provided by these WiFi APs may be relatively high compared to mobile communications network capabilities, such as GSM or LTE networks. User devices, such as mobile devices (e.g. smart phones, tablets, etc.) generally have the ability to transmit and/or receive data via one or more mobile communications networks, as well as WiFi network connections.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Figure 1A:
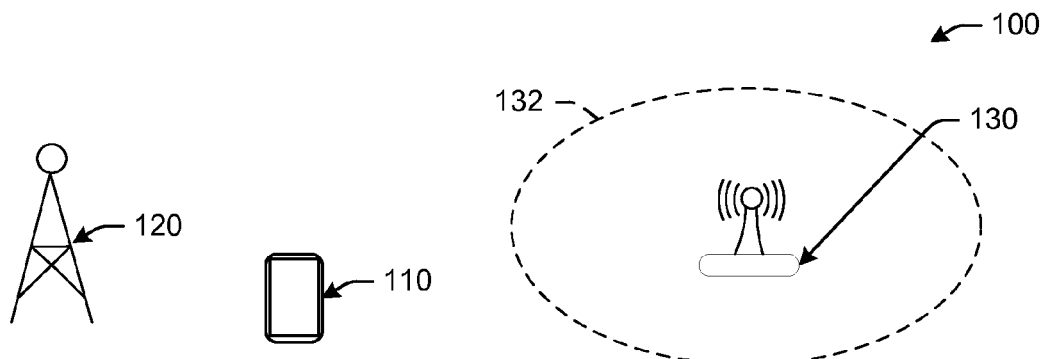
FIG. 1A is a simplified schematic diagram of an example environment having a user device that is outside of the range of a WiFi access point (AP) and transmits and/or receives data via mobile communications network infrastructure, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Example embodiments of the disclosure may provide systems, apparatus, and methods for providing location-based multiband roaming of user devices, such as mobile communication devices. Example embodiments may include a user device that is configured to seamlessly and securely transition from communicating via a mobile communication network to communicating via a WiFi connection when in relative proximity (i.e. radio range) of a WiFi access point (AP). The user device may be configured to determine its location from a variety of sources, such as global navigation satellite signals (GNSS), mobile cell tower triangulation, and/or inertial sensors. The user device may further be configured to provide its current location to a mobile communications network provider, such as a mobile communications network provider from which the user device receives network (e.g. data, voice, etc.) connectivity, or a third party service. Responsive to providing its current location, the user device may be configured to receive an indication of whether it is within radio and/or communications range of one or more WiFi APs with which it can connect to receive communications network services. The user device may still further be configured to receive association credentials of a WiFi AP, with which the user device may connect, responsive to providing its location to the mobile communications network provider. The association credentials, as received from the mobile communications network provider, may be used by the user device to connect to a WiFi AP that is in service in the current location of the user device, as determined by one or more mobile network server(s) associated with the mobile communications network provider and/or a third party service.

According to certain example embodiments of the disclosure, the user device may be configured to transmit its location to the mobile communications network provider or a third party service as a location message, such as a location message including one or more data packets. This location message may be transmitted by the user device intermittently, such as at a predetermined frequency, a user selected frequency, and/or a mobile network selected frequency to one or more mobile network server(s) associated with the mobile communications network provider or a third party source. The location message may, in example embodiments, carry information about the current location of the user device. This location information may be a set of spatial coordinates (e.g. latitude, longitude, altitude, etc.), a name of a place (e.g. neighborhood, zip code, building, etc.), or any other suitable identifier of location of the user device. In example embodiments, the location information carried by the location message may be determined from GNSS signals and/or inertial sensors (e.g. accelerometers, gyroscopes, etc.). In alternate example embodiments, the location information may be determined from mobile communications infrastructure (e.g. cell tower) based triangulation. In yet alternate example embodiments, the location information may be determined from WiFi AP-based triangulation. The location message may further carry identifying information of the user device. In some cases, the identifying information may identify the user device, a user subscription with the mobile communications network, and/or the user. In example embodiments, the identifying information may be stored in a memory or storage device of the user device. In some example embodiments, the identifying information may be stored in a subscriber identity module (SIM card) of the user device, particularly for user devices that use global system for mobile communications (GSM) standards.

The location message may be transmitted from the user device to the mobile network servers via a communications connection provided by the mobile communications network provider. The communications connection may be a wireless communications connections enabled by mobile communications infrastructure, such as cell towers with wireless communications antennas and/or transceivers disposed thereon. The mobile communications network may utilize any suitable communications standard and/or protocol including, but not limited to, GSM, 3G mobile communication, 4G mobile communication, long-term evolution (LTE), WiMax, direct satellite communications, code division multiple access (CDMA), time division multiple access (TDMA), orthogonal frequency division multiple access (OFDM), combinations thereof, or the like.

In further example embodiments, the user device may encrypt the location message prior to transmitting the location message to the mobile network servers of the mobile communications network provider or third party entity. In some example embodiments, the location message may be encrypted by instructions and/or algorithms enabled by instructions stored in a memory device or storage device of the user device, such as a subscriber identity module (SIM card). In example embodiments, any suitable encryption algorithm may be utilized to encrypt the location message. In some cases, a public/private key may be used for purposes of encrypting and/or decrypting location messages transmitted form a particular user device. In example embodiments, the SIM card may be utilized by the user device to perform the encryption of the location message prior to transmitting the location message to the mobile network servers.

In example embodiments, the user device may have one or more antennas and/or transceivers, such as antennas and/or transceivers (i.e. radios) for communicating via the mobile communications network provided by the mobile communications network provider, antennas and/or transceivers for communicating via WiFi APs, and/or antennas and/or receivers for receiving GNSS signals. In example embodiments, the user device may be configured to turn off its transceiver and associated circuitry for communication via WiFi while the user device is not connected to a WiFi AP and is intermittently transmitting its location to the mobile network servers as the location message generated by the user device and communicated via its transceiver and associated circuitry for communicating via the mobile communications network. In other words, the user device may not be searching for or receiving available WiFi signals and/or beacons when the user device is not connected to a WiFi AP and is transmitting its location to the mobile network servers. Therefore, while the user device is not connected to a WiFi network and is further not monitoring for WiFi beacon signals, the user device may be using relatively less power than if the WiFi radio and circuitry were turned on, thereby enhancing battery lifetime of the user device.

In certain example embodiments, the user device may be configured to receive an association message from the mobile network servers, responsive to one or more location messages transmitted by the user device to the mobile network servers. The association message may, in example embodiments, be received via the mobile communications network antenna and radio of the user device from one or more communications network infrastructure of the mobile communications network provider. The association message may be received as one or more data packets and the user device may be configured to demodulate and/or decode the association message from the mobile network servers. In example embodiments, the association message may be encrypted. In these cases, the user device may be configured to decrypt the association message.

The association message may carry authentication credentials (e.g. basic service set identification (BSSID), password, etc.) associated with a WiFi network that is available at the current location of the user device. The user device may be configured to utilize the received authentication credentials to connect to the WiFi network available at its current location. In example embodiments, some or all of the user device's WiFi infrastructure (i.e. WiFi transceiver, antenna, related circuitry, and/or instructions) may be turned off prior to receiving the association message from the mobile network servers. The WiFi transceiver and related circuitry may be turned off, in example embodiments, to save power and/or increase battery lifetime. In these embodiments, the user device may be configured to turn on and/or powering up its WiFi transceiver and related circuitry upon receipt of the association message to be able to connect to the available WiFi network.

Upon connecting to the WiFi network, in example embodiments, the user device may be configured to switch over the bandwidth needs of applications, programs, software, and/or instructions being executed thereon to the newly connected WiFi network. In other words, the user device may use communications bandwidth of the WiFi network to which it connected using the authentication credentials received as part of the association message. In example embodiments, the user device may reduce and/or completely stop using communications bandwidth via the mobile communications network when it starts using the WiFi network for which it received authentication credentials based at least in part on the user device current location communicated form the user device to the mobile network servers. It will be appreciated that when the user device shifts some or all of its communications bandwidth usage from the mobile communications network to the WiFi network, the communications bandwidth demand and/or load of the mobile communications network may be relatively reduced.

In some example embodiments, the user device, upon connecting to the available WiFi network may be configured to seamlessly transition currently running applications and/or software to utilize the communications bandwidth available from the WiFi network. These applications and/or software being executed on the user device may be any variety of suitable applications and/or software including, for example, business software, communications (e.g. voice, electronic mail (email), text messaging, etc.) software, social networking software, gaming software, content viewing and/or streaming software, document preparation software, navigation and/or mapping software, combinations thereof, or the like. These application and/or software when utilizing communications bandwidth, may be switched over from the use of the mobile communications network to the WiFi network without interrupting services provided to the user of the user device. The switch over process of the applications from one source of communications bandwidth to the other may be performed by any combination of hardware and/or software, such as by a stand-alone software routine or a sub-routine of an operating system of the user device.

The user device, in some example embodiments, may be configured to shut off or place in a low power or standby mode its transceiver and related circuitry associated with communications via the mobile communications network while bandwidth on the WiFi network is being utilized as needed by applications operating on the user device. In other example embodiments, the WiFi transceiver and circuitry, as well as the mobile communications network transceiver and circuitry of the user device may be operational contemporaneously. In some example embodiments, when the user device is connected to the WiFi network, some application running on the user device may be provided communication bandwidth from the mobile communications network and others will may be provided communications bandwidth form the WiFi network. In still further example embodiments, hardware and/or software implemented on the user device may decide on which applications, if any, that are to utilize the WiFi network communications bandwidth and those that are to utilize mobile communications network bandwidth. It will be appreciated that by The user device may be further configured to detect, when connected to a WiFi network, that it is no longer within radio range or may imminently not be within radio range of the WiFi network. In this case, the user device may either reactively or pre-emptively switch the applications running thereon from the usage of the WiFi network bandwidth to the use of the mobile communications network bandwidth. In some example cases, the user device may transfer application(s) from utilizing WiFi network bandwidth to the mobile communications network bandwidth when the received signal strength indication (RSSI) of the WiFi signal is less than a predetermined threshold level.

The systems, apparatus, and methods, as described herein, may further provide for the mobile network servers that may be configured to receive location messages from a plurality of user devices that are using mobile communications network bandwidth and identify respective locations associated with each of the user devices. The mobile network servers may further be configured to determine from a user device location information, as carried by a location message from the user device via the mobile communications network, if the corresponding user device is within radio range of a WiFi network and/or WiFi AP that is accessible by the user device. In example embodiments, the mobile network servers may be configured to determine this information by accessing a datastore, such as a WiFi infrastructure datastore, that contains a mapping of WiFi APs and their respective corresponding locations and/or service area. Based at least in part on this information, the mobile network servers may be configured to generate and transmit an association message carrying WiFi connection information, such as BSSID and authentication credentials of a WiFi network to which the user device may connect in its present location, to the user device. The mobile network servers may further be configured to receive updates to the mapping of WiFi APs and their locations and/or areas and/or connection information from a variety of sources, such as organizations that deploy and/or control the available WiFi APs. In some cases, updates may be received from one or more user devices.

It will be appreciated that in example embodiments, the mobile communication network operator may be able to better manage available mobile communication network bandwidth by having the opportunity to offload some bandwidth needs to out-of-band communications network resources. This may particularly be useful in locations with high population density and/or high communications bandwidth demand, such as in big cities, where the available communications bandwidth of the mobile communications network may be relatively highly utilized, such as near or at its bandwidth capacity. In example embodiments, the mobile network operator itself may deploy WiFi APs or contract with a third party to deploy WiFi APs for the purposes of offloading some bandwidth off of its wireless infrastructure for its mobile communications network where there may be a relatively greater chance of bandwidth bottlenecks. Therefore, the user of the user device may experience a relatively better user experience (e.g. greater overall communications bandwidth, uninterrupted supply of communications bandwidth, etc.) if the user device and/or the mobile communications network operator is better able to manage the source of communications bandwidth offered to the user devices connected to the mobile communications network, in accordance with the systems, methods, and apparatus disclosed herein. In some example embodiments, on or more of the user of the user device and/or the mobile network operator may provide compensation, such as a pre-established monetary agreement, to the operators of WiFi hotspots, for the use of their WiFi infrastructure.

Figure 1B:
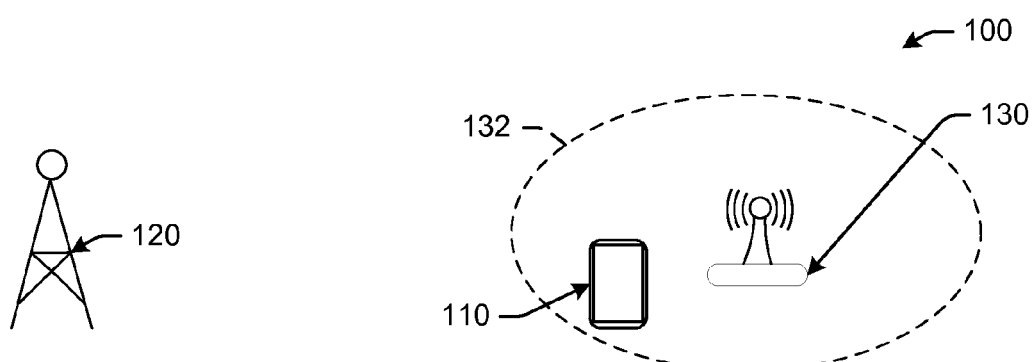
FIG. 1B is a simplified schematic diagram of a time progression of the example environment of FIG. 1A, where the user device has been moved into the range of the WiFi AP and transmits and/or receives data via the WiFi AP, in accordance with example embodiments of the disclosure.
Figure 1C:
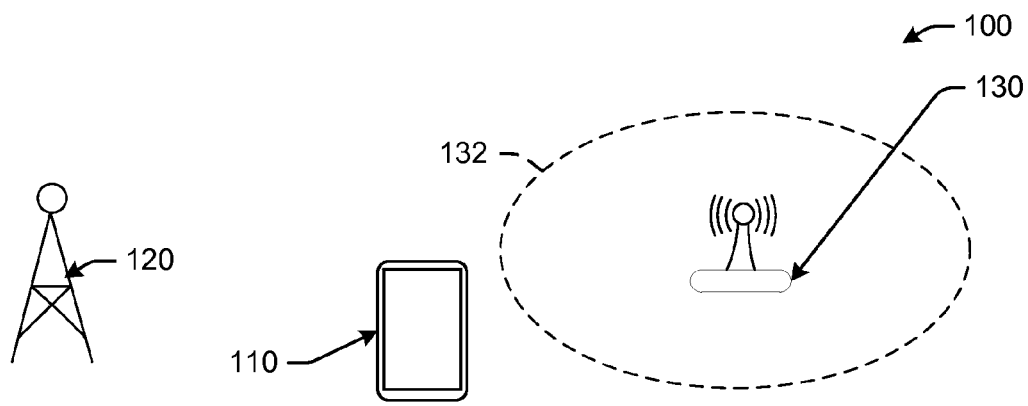
FIG. 1C is a simplified schematic diagram of a time progression of the example environment having where the user device has again been moved outside of the range of a WiFi AP and again transmits and/or receives data via the mobile communications network infrastructure, in accordance with example embodiments of the disclosure.

The concepts described above may be better understood with reference to FIGS. 1A, 1B, and 1C. FIG. 1A is a simplified schematic diagram of an example environment 100 having a user device 110 that is outside of the range 132 of a WiFi access point (AP) 130 and transmits and/or receives data via mobile communications network infrastructure 120, in accordance with example embodiments of the disclosure. In this case, the user device 110 may be executing one or more applications thereon that use communications (e.g. voice, data, etc.) bandwidth, and since it is outside of the range 132 of the WiFi AP 130, mobile communications network bandwidth may be used by the user device 110.

FIG. 1B is a simplified schematic diagram of a time progression of the example environment 100 of FIG. 1A, where the user device 110 has been moved into the range 132 of the WiFi AP 130 and transmits and/or receives data via the WiFi AP 130, in accordance with example embodiments of the disclosure. In this case, a user of the user device 110 may have moved the user device 110, such as by carrying it, to within the range 132 of the WiFi AP 130. The user device 110 may be configured to periodically transmit its location, such as part of a location message, to mobile network servers. In example embodiments, the location message transmitted by the user device 110 may be encrypted. The mobile network servers may identify, in the case of FIG. 1B, that the user device 110 is within the range 132 of the WiFi AP, and responsive to that determination, generate and transmit a connection message to the user device 110. The connection message may provide the user device 110 with WiFi network association information, such as an SSID and/or password for connecting to the WiFi network with which the WiFi AP 130 is affiliated. The user device 110 may be configured to connect to the WiFi network with which the WiFi AP 130 is associated using the network association information received via the connection message. In some example embodiments, the user device WiFi radio may be turned off prior to receiving the connection message to save power and/or enhance battery life. In these cases, the user device 110 may be configured to turn on its WiFi radio prior to connecting to the WiFi network of the WiFi AP 130. Once the user device 110 connects to the WiFi network of the WiFi AP 130, the user device 110 may be configured to transfer the communication bandwidth needs of some or all of the applications and/or software running thereon from the mobile communications network to the WiFi network.

FIG. 1C is a simplified schematic diagram of a time progression of the example environment 100 where the user device 110 has again been moved outside of the range 132 of the WiFi AP 130 and again transmits and/or receives data via the mobile communications network infrastructure 120, in accordance with example embodiments of the disclosure. In this case, the user of the user device 110 may have moved the user device 110, such as by carrying it, outside of the range 132 of the WiFi AP 130. The user device 110, in example embodiments, may be configured to identify that it has or is about to move outside of the range 132 of the WiFi AP 130, such as by determining that the RSSI of the WiFi signal from the WiFi AP 130 is below a predetermined threshold level. When the user device 110 determines that it is no longer within the radio range 132 of the WiFi AP 130, it may be configured to transfer the communication bandwidth needs of some or all of the applications and/or software running thereon from the WiFi network back to the mobile communications network. The user device 110 may further be configured to turn its WiFi radio back off, in some example embodiments. The user device 110 may still further be configured to resume intermittently transmitting its location as a location message to the mobile network servers 120.

Figure 2:
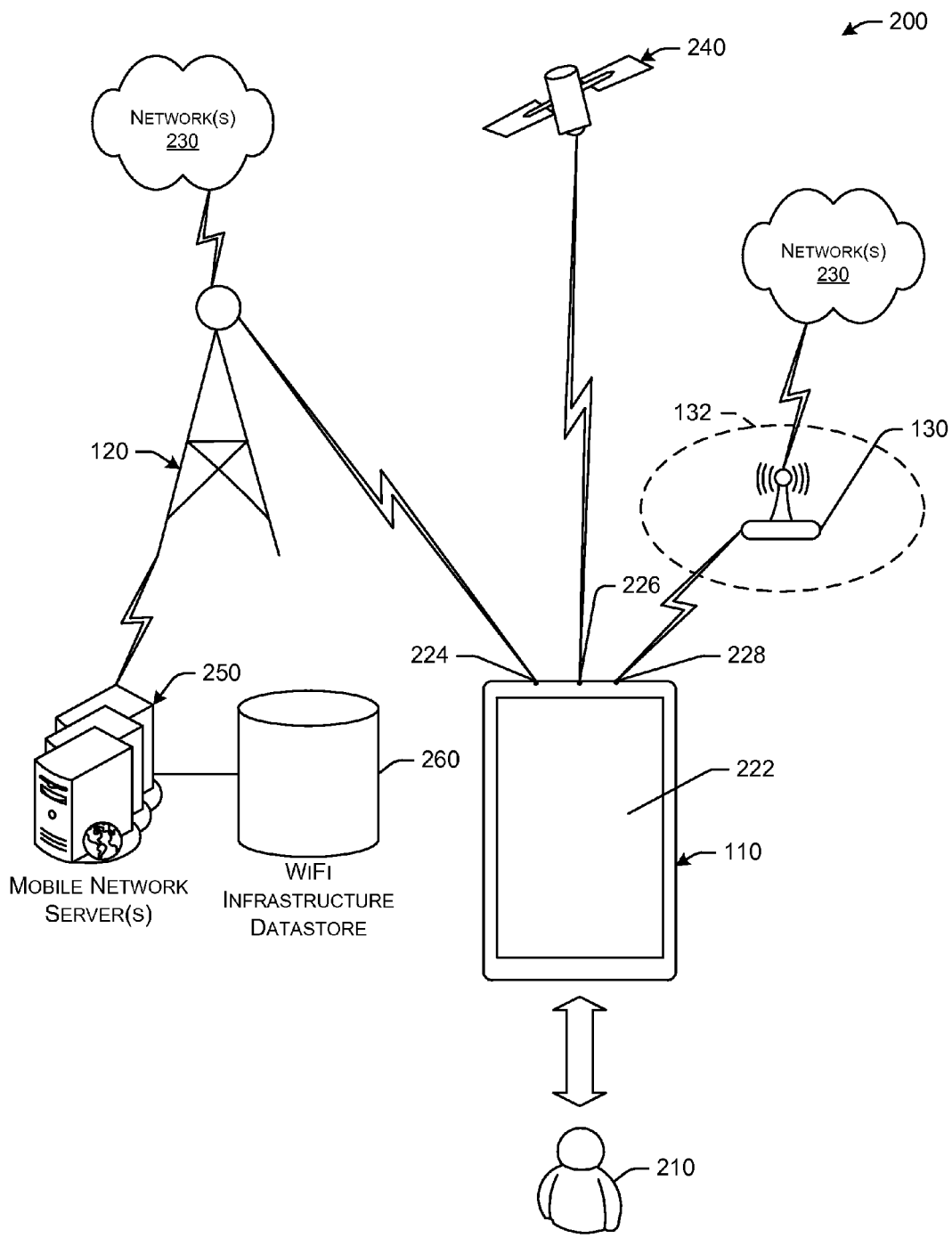
FIG. 2 is a simplified schematic diagram illustrating location-based multi-band roaming of a user device, in accordance with example embodiments of the disclosure.

Some example elements involved in the operation of the systems, methods, and apparatus disclosed herein may be better understood with reference to FIG. 2. FIG. 2 is a simplified schematic diagram illustrating location-based multiband roaming of the user device 110, in accordance with example embodiments of the disclosure. An environment 200 may include the user device 110 with which a user 210 may interact, the WiFi AP 130 with its associated range 132, the mobile communications network infrastructure 120, one or more network(s) 230, a navigation satellite 240 or other source of GNSS signal, and one or more mobile network server(s) 250.

The user device 110 may be any one of suitable devices that may be configured to execute one or more applications, software, and/or instructions to provide one or more services to the user 210. The user device 110, as used herein, may be any variety of client devices, electronic devices, communications devices, and/or mobile devices. The user device 110 may include, but is not limited to, tablet computing devices, electronic book (ebook) readers, netbook computers, Ultrabook™, notebook computers, laptop computers, desktop computers, personal digital assistants (PDA), smart phones, web-enabled televisions, video game consoles, set top boxes (STB), or the like. While the drawings and/or specification may portray the electronic device 110 in the likeness of a smartphone, the disclosure is not limited to such. Indeed, the systems and methods described herein may apply to any electronic device 110 utilizing communications bandwidth and configured to receive communications bandwidth from the mobile communication network infrastructure 120 and/or the WiFi AP 130. The user devices 110 may be used by users 210 for a variety of purposes, including functionality such as web browsing, business, communications, graphics, word processing, publishing, spreadsheets, databases, gaming, education, entertainment, media, project planning, engineering, drawing, or combinations thereof. Many of this functionality may use communications bandwidth provided via the mobile communication network infrastructure 120 and/or the WiFi AP 130.

The user device 110 may include one or more user interface(s) 222 for receiving user 210 input and/or providing output to the user 210. The user interfaces 222 may be in the form of a touch screen, microphone, accelerometer sensor, speaker, or any other suitable user interface 222 that may be used by the user 210 to interact with the user device 110.

The user device 110 may still further include an antenna 224 for receiving and/or transmitting communications signals from/to the mobile communications infrastructure, an antenna 226 for receiving GNSS signals from the GNSS satellite 240, and an antenna 228 for receiving and/or transmitting communications signals from/to the WiFi AP 130. The antennas 224, 226, 228 may be any suitable type of antenna corresponding to the communications protocols used by the user device 110 for the particular signals received and/or transmitted via the antennas 224, 226, 228. Some non-limiting examples of suitable antennas 224, 226, 228 include directional antennas, non-directional antennas, dipole antennas, folded dipole antennas, patch antennas, multiple-input multiple-output (MIMO) antennas, or the like. The antenna 224, 226, 228 may be communicatively coupled to a radio component to transmit and/or receive signals, such as communications signals or GNSS to and/or from the user devices 110.

The mobile communications network antennas 224 may be configured to receive and/or transmit signals in accordance with established standards and protocols, such as GSM, 3G mobile communication, 4G mobile communication, LTE, WiMax, direct satellite communications, CDMA, TDMA, OFDM, combinations thereof, or the like.

The GNSS antennas 226, in example embodiments may be configured to receive GNSS signals from three or more GNSS satellites 240 carrying time-position information to triangulate a position therefrom. The GNSS antennas 226 may be configured to receive GNSS signals form any one of known current GNSS or planned GNSS, such as the Global Positioning System (GPS), the GLONASS System, the Compass Navigation System, the Galileo System, or the Indian Regional Navigational System.

The Wi-Fi antennas 228 may be configured to receive and/or transmit signals in accordance with established standards and protocols, such as Institute of Electrical and Electronics Engineers (IEEE) 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11 ad). In alternative example embodiments, the antennas 228 may be configured to receive and/or transmit non-Wi-Fi protocol signals, such as Bluetooth, dedicated short-range communication (DSRC), or other packetized radio communications.

The mobile communication network infrastructure 120 may be any suitable infrastructure, such as cellular towers that may be configured to receive and/or transmit communications signals from/to the user device 110 and thereby provide the user device 110 with a communicative connection to the one or more networks 230. The mobile communications network infrastructure 120 may be configured to utilize any suitable communications standard and/or protocol for communicating with the user device 110 including, but not limited to, GSM, 3G mobile communication, 4G mobile communication, LTE, WiMax, direct satellite communications, CDMA, TDMA, OFDM, combinations thereof, or the like.

The one or more GNSS satellites 240 may include a plurality of satellites broadcasting radio frequency (RF) signals including satellite transmission time and position information. The satellite RF signals of the GNSS satellites 240 may be from a constellation include any suitable number of satellites (e.g., 24 GPS satellites) orbiting the earth, for example, in a low earth orbit (LEO) to allow broad coverage.

The WiFi AP 130 may be configured to communicate via one or more WiFi and/or WiFi direct protocols, as standardized by the Institute of Electrical and Electronics Engineers (IEEE) 802.11 standards. In certain embodiments, the WiFi AP 130 may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). The WiFi AP 130 may be connected to the one or more networks 230 via hardwire or wireless connections. The WiFi AP 130 may be configured to allow the user device 110 communicative connectivity to the networks 230. The WiFi AP 130 may be configured to receive association information, such as an SSID, an identification of the user device 110, and/or password to establish a connection with the user device 110.

The networks 230 may include any one or a combination of different types of suitable communications networks, such as cable networks, the Internet, wireless networks, cellular networks, and other private and/or public networks. Furthermore the networks 140 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

The mobile network servers 250 may be configured to receive location messages from one or more user devices 110 that are using mobile communications network bandwidth. From the location messages, the mobile network servers 250 may be configured to identify a current location of a particular user device 110 associated with a particular user 210. In example embodiments, the location message received by the mobile network servers 150, such as via the mobile communications network and/or the networks 230, may be encrypted and the mobile network servers 250 may be configured to decrypt the location message to extract the location information and/or user or user device identity information therefrom. Upon identifying the location of the user device 250, the mobile network servers 250 may further be configured to identify if the user device 250 is within radio range of a WiFi network and/or WiFi AP 130 that is accessible by the user device 110. In example embodiments, the mobile network servers 250 may be configured to determine this information by accessing a datastore, such as a WiFi infrastructure datastore 260, that contains a mapping of WiFi APs 130 and their respective corresponding locations and/or service area. This information, for example may be stored as a look up table, such as with a range of spatial coordinates mapped to a corresponding respective SSID of a WiFi AP 130.

Based at least in part on identifying that the user device 110 is within radio range of the WiFi AP 130, the mobile network servers 250 may be configured to generate and transmit an association message carrying WiFi connection information, such as BSSID and authentication credentials of a WiFi network to which the user device 110 may connect in its present location. The mobile network servers 250 may further be configured to receive updates to the mapping of WiFi APs and their locations and/or areas and/or connection information from a variety of sources, such as organizations that deploy and/or control the available WiFi APs. In some cases, updates may be received from one or more user devices.

Figure 3:
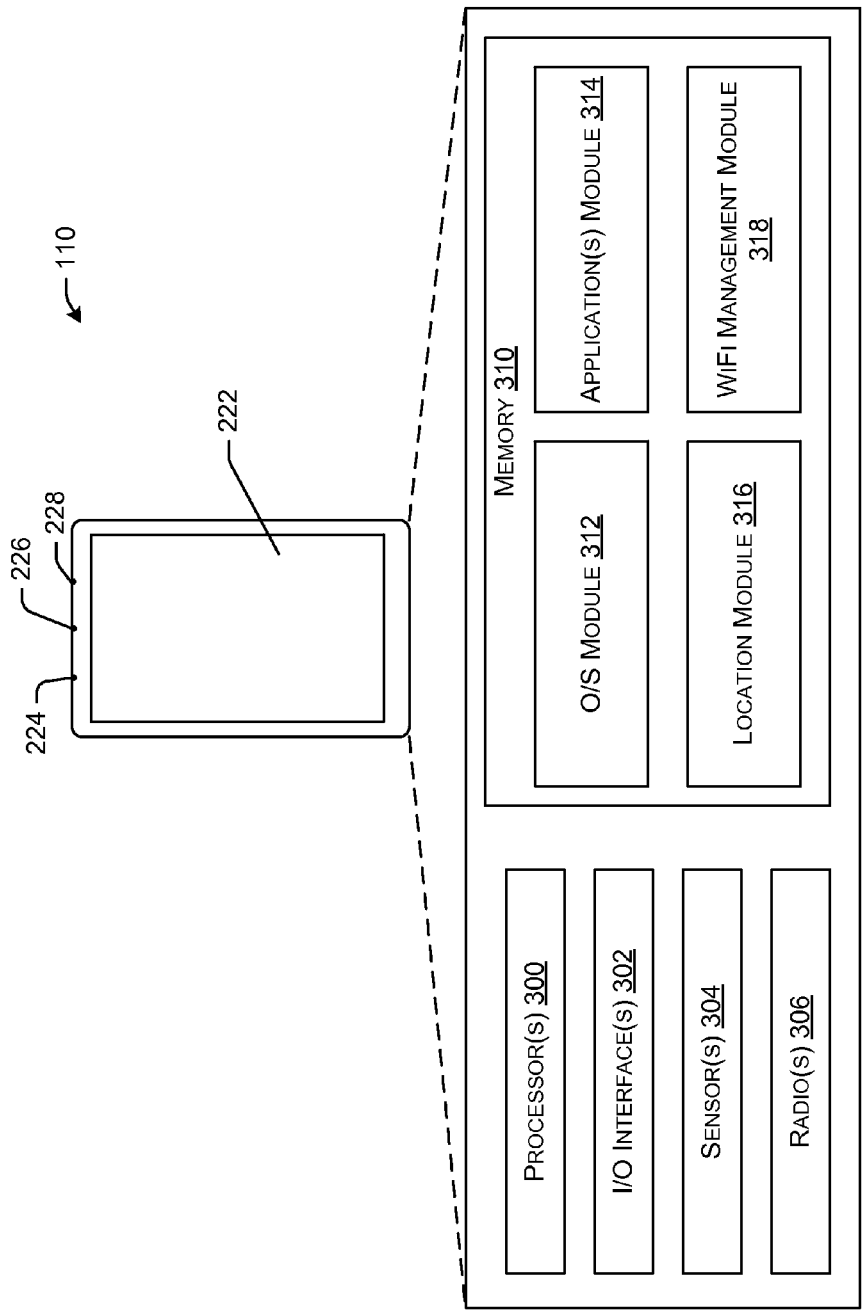
FIG. 3 is a simplified block diagram illustrating an example architecture of a user device configured for location-based multi-band roaming, in accordance with example embodiments of the disclosure.

FIG. 3 is a simplified block diagram illustrating an example architecture of the user device 110 configured for location-based multi-band roaming, in accordance with example embodiments of the disclosure. The user device 110 may include one or more processors 300, one or more input/output (I/O) interfaces 302, one or more sensors 304, one or more transceivers and/or radios 306, and one or more memories 310.

The one or more I/O device interfaces 302 may enable the use of one or more (I/O) device(s) or user interface(s), such as I/O devices 222. A user 210 may be able to administer the systems and methods disclosed herein by interacting with the user device 110 via the I/O device interfaces 302. The sensor(s) may include any suitable sensors including, for example, inertial navigation sensors that may include, for example, accelerometers or gyros, such as micro-electromechanical systems (MEMS) based accelerometers. These sensor(s) may be used in conjunction with GNSS signals received by the user device 110 to determine its location.

The transmit/receive (transceiver) or radio component 306 may include any suitable radio(s) and/or transceiver(s) for transmitting and/or receiving radio frequency (RF) signals in the bandwidth and/or channels corresponding to the communications protocols utilized by the user device 110 to communicate with other user devices 110 and/or via network(s) 230. The radio component 306 may include hardware and/or software to modulate communications signals according to pre-established transmission protocols. The radio component 306 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radio component 306, in cooperation with the communications antennas 224, 228, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-Wi-Fi protocols may be used for communications between user devices 110, such as Bluetooth, dedicated short-range communication (DSRC), or other packetized radio communications. The radio component 306 may include any known receiver and baseband suitable for communicating via the communications protocols of the user device 110. The radio component 306 may further include a low noise amplifier (LNA), additional signal amplifiers, an analog-to-digital (A/D) converter, one or more buffers, and digital baseband. The one or more radio(s) 306 may further be configured to receive and/or transmit signals of the mobile communications network including protocols, such as GSM, 3G mobile communication, 4G mobile communication, LTE, WiMax, direct satellite communications, CDMA, TDMA, OFDM, combinations thereof, or the like. The one or more radio(s) 306 may yet further be configured to receive GNSS signals, such as via the antenna 226.

The processors 300 of the user device 110 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processors 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 110 may also include a chipset (not shown) for controlling communications between one or more processors 300 and one or more of the other components of the user device 110. The processors 300 may also include one or more application specific integrated circuits (ASICs) or application specific standard products (ASSPs) for handling specific data processing functions or tasks. In certain example embodiments, the user device 110 may be based on an Intel® Architecture system and the one or more processors 300 and chipset may be from a family of Intel® processors and chipsets, such as the Intel® Atom® processor family.

The memory 310 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, a location module 316, and a WiFi management module 318. Each of the modules and/or software may provide functionality for the user device 110, when executed by the processors 300. The modules and/or the software may or may not correspond to physical locations and/or addresses in memory 310. In other words, the contents of each of the modules 312, 314, 316, 318 may not be segregated from each other and may, in fact be stored in at least partially interleaved positions on the memory 310.

The O/S module 312 may have one or more operating systems stored thereon. The processors 300 may be configured to access and execute one or more operating systems stored in the (O/S) module 312 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more functionality associated with the directional transmission and reception of wireless signals and task processing. These instructions and/or applications may, in certain aspects, interact with the (O/S) module 312 and/or other modules of the wireless network devices 130. The applications module 314 may have instructions, software, and/or code stored thereon that may be launched and/or executed by the processors 300 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The location module 316 may have instructions stored thereon that, when executed by the processors 300, enable the user device 110 to provide a variety of functions related to determining and communicating its current location. The processors 300 may be configured to determine its location from a variety of sources, such as GNSS signals received via antenna 126 and radio 306, mobile communications infrastructure 120 based triangulation, and/or inertial sensors 304, such as MEMS-based multi-axis accelerometers of the user device 110. The processors 300 may further be configured to provide its current location to the mobile network server(s) 250.

According to certain example embodiments of the disclosure, the user device 110 and the processors 300 thereon, by executing instructions stored in the location module 316 may be configured to transmit its location to the mobile network server(s) 250 or a third party service as a location massage, such as a location message including one or more data packets. This location message may be transmitted by the user device intermittently, such as at a predetermined frequency (e.g. every 2 second, every minute, etc.), a user selected frequency (e.g. a user selected parameter of the user device 110), and/or a mobile network selected frequency, to the one or more mobile network server(s) 250 associated with the mobile communications network provider or the third party source. The processors 300 may be configured to transmit the location message via communications bandwidth of the mobile communications network. The location message may, in example embodiments, carry information about the current location of the user device 110. This location information may be a set of spatial coordinates, a name of a place (e.g. neighborhood, zip code, building, etc.), or any other suitable identifier of location of the user device. In example embodiments, the location information carried by the location message may be determined from GNSS signals and/or inertial sensors (e.g. accelerometers, gyroscopes, etc.) 340. The location message may further carry identifying information of the user device. In some cases, the identifying information may identify the user device 110, a user subscription with the mobile communications network, and/or the user 210. In example embodiments, the identifying information may be stored in a memory 310 or storage device of the user device 110. In some example embodiments, the identifying information may be stored in a SIM card of the user device 110, particularly for user devices 110 that use GSM standards.

The processors 300 of the user device 110, by further executing instructions stored in the location module 316, may be configured to encrypt the location message prior to transmitting the location message to the mobile network servers 250 of the mobile communications provider or third party entity. In some example embodiments, the location message may be encrypted by instructions and/or algorithms enabled by instructions stored in the memory 310 of the user device 110, such as, for example, in the SIM card for GSM standards enabled user devices 110. In example embodiments, the processors 300 may be configured to utilize any suitable encryption algorithm to encrypt the location message. In some cases, a public/private key based encryption may be used for purposes of encrypting and/or decrypting location messages transmitted form a particular user device 110. In example embodiments, a SIM card may be utilized by the user device 110 and the processors 300 thereon to perform the encryption of the location message prior to transmitting the location message to the mobile network server(s) 250.

The WiFi management module 318 may have instructions stored therein that may be executed by the processors 300 to provide functionality associated with connecting and/or disconnecting with available WiFi networks in the relative proximity of the user device 110. The processors 300 may be configured, responsive to providing its current location, to receive an indication of whether user device 110 is within radio and/or communications range of one or more WiFi APs 130 with which it can connect to receive communications (e.g. voice, data, etc.) services. The processors 300 may still further be configured to receive association information of a WiFi AP 130, with which the user device may connect to a WiFi network associated with the WiFi AP 130 for which it has association information. The association information, as received from the mobile network server(s) 250, may be used by the user device 110 to connect to the WiFi AP 130 that is in service in the current location of the user device. The processors 300 may further be configured to detect, when connected to a WiFi network, that it is no longer within radio range or may imminently not be within radio range of the WiFi network. In this case, the processors 300 may be configured to either reactively and/or pre-emptively switch the applications running thereon from the usage of the WiFi network bandwidth to the use of the mobile communications network bandwidth. In some example cases, the user device may transfer application(s) from utilizing WiFi network bandwidth to the mobile communications network bandwidth when the received signal strength indication (RSSI) of the WiFi signal is less than a predetermined threshold level.

It will be appreciated that there may be overlap in the functionality of the instructions stored in the operating systems (O/S) module 312, the applications module 314, the location module 316, and/or the WiFi management module 318. In fact, the functions of the aforementioned modules 312, 314, 316, 318 may interact and cooperate seamlessly under the framework of the user device 110. Indeed, each of the functions described for any of the modules 312, 314, 316, 318 may be stored in any module 312, 314, 316, 318 in accordance with certain embodiments of the disclosure. Further, in certain embodiments, there may be one single module that includes the instructions, programs, and/or applications described within the operating systems (O/S) module 312, the applications module 314, the location module 316, and/or the WiFi management module 318.

Figure 4:
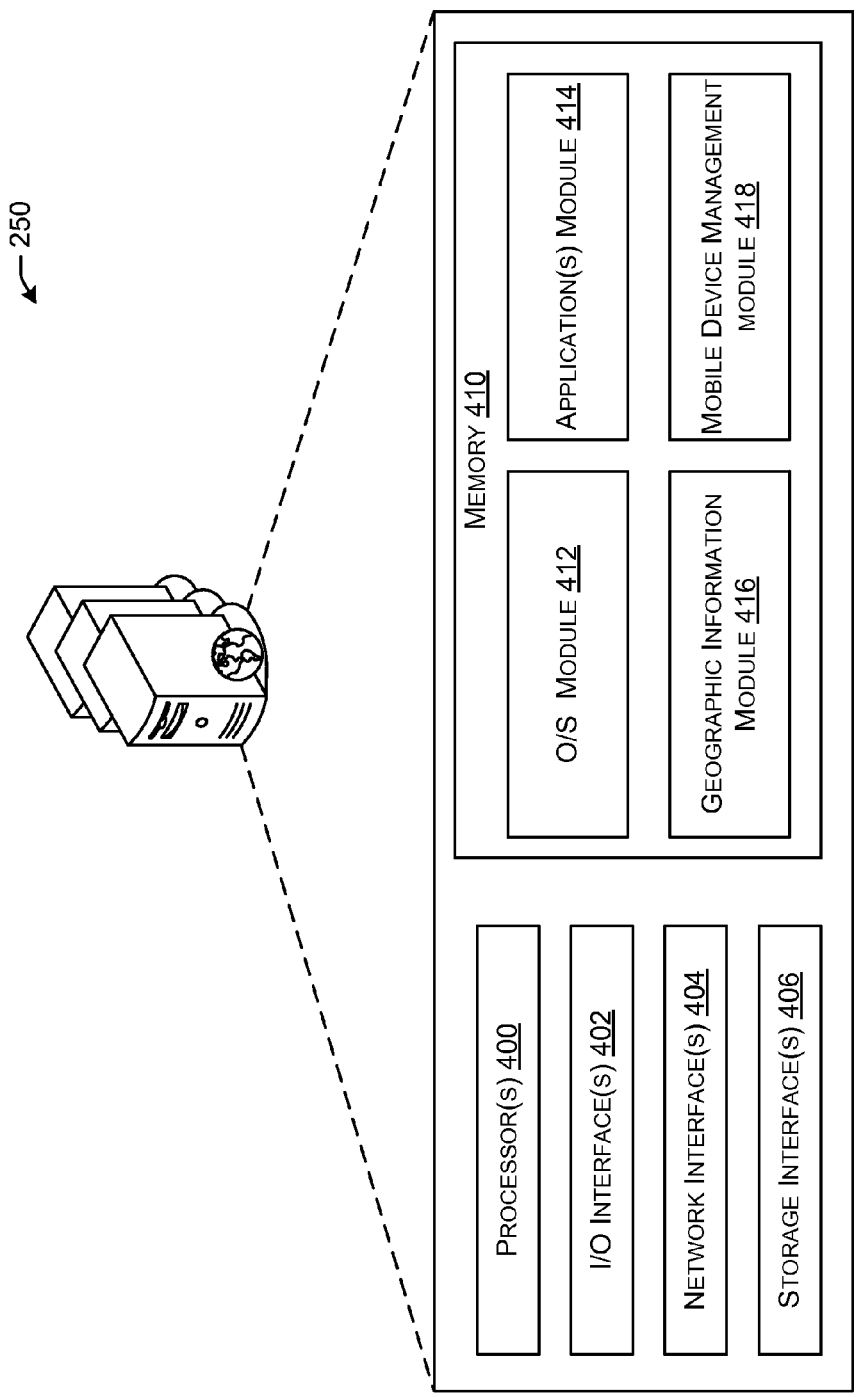
FIG. 4 is a simplified block diagram illustrating an example architecture of mobile network server(s) for location-based multi-band roaming, in accordance with example embodiments of the disclosure.

FIG. 4 is a simplified block diagram illustrating an example architecture of mobile network server(s) 250 for location-based multi-band roaming, in accordance with example embodiments of the disclosure. The mobile network servers 250 may include one or more processors 400, I/O interface(s) 402, network interface(s) 404, storage interface(s) 406, and memory 410. Input/output (I/O) device(s) such as display screen(s), speaker(s), microphone(s), keyboard(s), or the like, may be controlled via the one or more I/O device interfaces 402. The network interfaces(s) 404 may allow the mobile network server(s) 250 to communicate via the networks 230 and/or via other communicative channels. The mobile network server(s) 250 may, therefore, be configured to access one or more remote servers, cloud servers, and/or cloud storage resources. The storage interface(s) 406 may enable the mobile network server(s) 250 to read and/or write to any variety of datastores, including, for example, the WiFi infrastructure datastore 260.

The description of the one or more processors 400 and the one or more memories 410 of the mobile network server(s) 250 may be substantially similar to the description of the one or more processors 300 and one or more memories 310, respectively, of the user device 210 of FIG. 3, and in the interest of brevity, will not be repeated here.

Turning to the contents of the memory 410 in more detail, the memory 410 may include an operating systems (O/S) module 412, an applications module 414, a geographic information module 416, and a mobile device management module 418. Each of the modules and/or software may provide functionality for the mobile network server(s) 250, when executed by the processors 400. The modules and/or the software may or may not correspond to physical locations and/or addresses in memory 410. In other words, the contents of each of the modules 412, 414, 416, 418 may not be segregated from each other and may, in fact be stored in at least partially interleaved positions on the memory 410.

The description of the operating systems (O/S) module 412 and the applications module 414 of the mobile network server(s) 250 may be substantially similar to the description of the operating systems (O/S) module 312 and the applications module 314, respectively, of the user device 110 of FIG. 3, and in the interest of brevity, will not be repeated here.

The geographic information module 416 may have instructions stored therein that may be executed by the processors 400 to provide functionality to the mobile network server(s) 250 associated with determining, based at least in part on the location of a user device 110, if that user device 110 is with radio range of a WiFi network and/or one or more WiFi APs 130 of the WiFi network. The processors 400 may be configured to receive location messages from a plurality of user devices 110 that are using mobile communications network bandwidth and identify respective locations associated with each of the user devices 110 based at least in part on their respective corresponding location messages. In some example embodiments, the processors 400 may be configured to decrypt location messages received from user device(s) 110, particularly if the location message was encrypted prior to transmission by the corresponding respective user device 110. The mobile network servers 250 and the processors 400 thereon may further be configured to determine from the user device location information, as carried by the location message from a user device 110 via the mobile communications network, if the corresponding user device 110 is within radio range of a WiFi network and/or WiFi AP 130 that is accessible by the user device 110. In example embodiments, the mobile network servers 250 may be configured to determine this information by accessing a datastore, such as the WiFi infrastructure datastore 260, that contains a mapping of WiFi APs 130 and their respective corresponding locations and/or service area. The processors 400 may be configured to access the WiFi infrastructure datastore 260 and find a location corresponding to a user device 110, as identified from a location message received from the user device 110, in the WiFi infrastructure datastore 260 to identify one or more WiFi networks available at the current user device location.

The mobile device management module 418 may have instructions stored therein that may be executed by the processors 400 to provide functionality to the mobile network server(s) 250 associated with communicating WiFi association information to one or more user devices 110. Based at least in part on this information, the processors 400 may be configured to generate and transmit an association message carrying WiFi connection information, such as BSSID and authentication credentials of a WiFi network to which the user device 110 may connect in its present location. In some example embodiments, the processors 400 may be configured to encrypt the association message before transmitting the association message to the corresponding user device 110. Encryption, in this case may prevent snooping and providing indication to others of the location of a particular user 210. The processors 400 may further be configured, by executing instructions stored on the mobile device management module 418, to receive updates to the mapping of WiFi APs and their locations and/or areas and/or connection information from a variety of sources, such as organizations that deploy and/or control the available WiFi APs. In some cases, updates may be received from one or more user devices 110. Based at least in part on received information about changes in WiFi infrastructure (i.e. location of new WiFi APs 130, changes to location of existing WiFi APs 130, and/or removal of WiFi APs 130), the processors 400 may be configured to update the WiFi infrastructure datastore 260.

It will be appreciated that there may be overlap in the functionality of the instructions stored in the operating systems (O/S) module 412, the applications module 414, the geographic information module 416, and the mobile device management module 418. In fact, the functions of the aforementioned modules 412, 414, 416, 418 may interact and cooperate seamlessly under the framework of the mobile network server(s). Indeed, each of the functions described for any of the modules 412, 414, 416, 418 may be stored in any module 412, 414, 416, 418 in accordance with certain embodiments of the disclosure. Further, in certain embodiments, there may be one single module that includes the instructions, programs, and/or applications described within the operating systems (O/S) module 412, the applications module 414, the geographic information module 416, and the mobile device management module 418.

Figure 5:
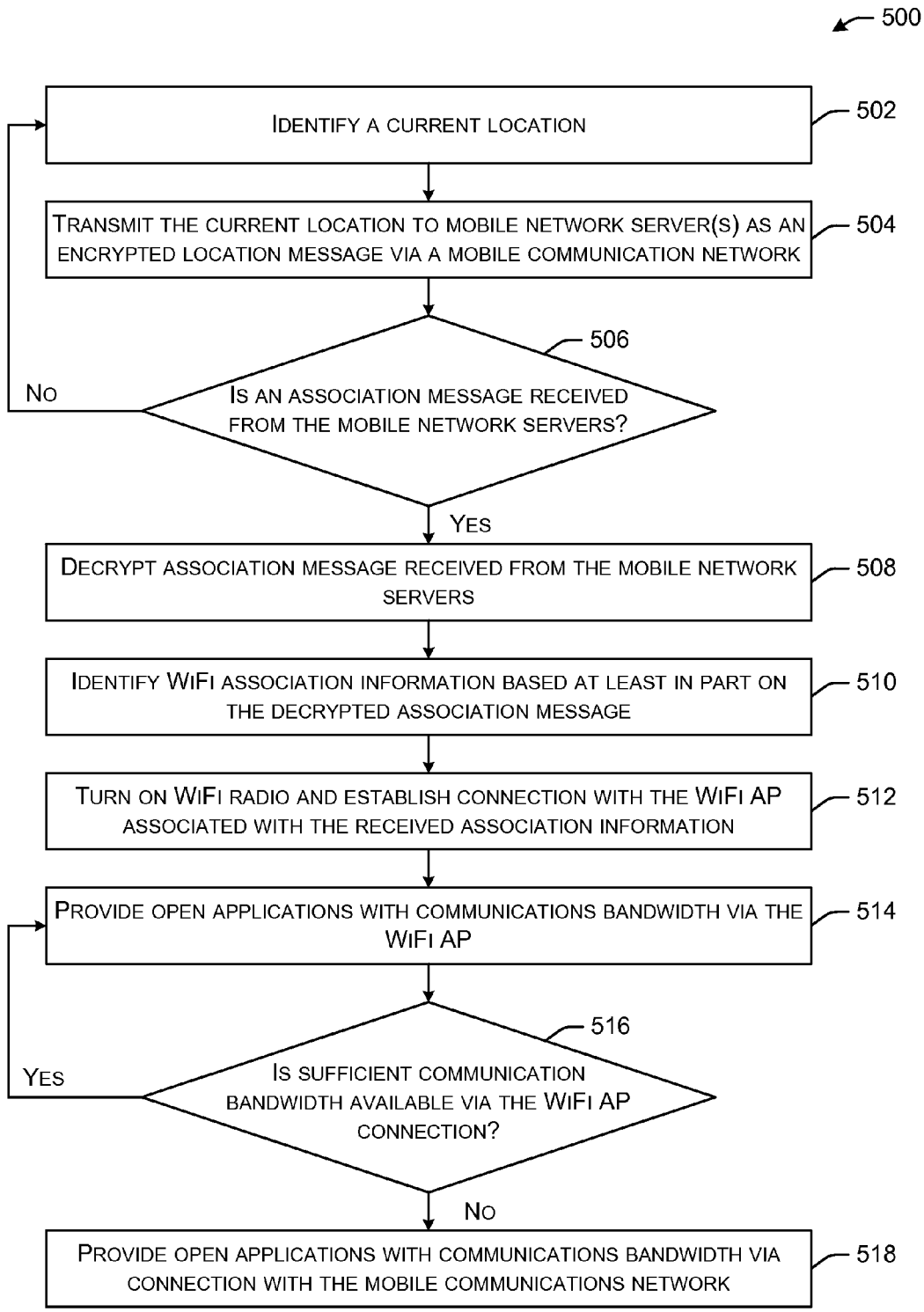
FIG. 5 is a flow diagram illustrating an example method for switching from/to a mobile communication network to/from a WiFi AP based at least in part on a location of a user device, in accordance with certain example embodiments of the disclosure.

FIG. 5 is a flow diagram illustrating an example method 500 for determining and transmitting one or more radio parameters associated with one or more wireless network devices 130, in accordance with certain example embodiments of the disclosure. This method 500 may be performed by a user device 110 and the processors 300 thereon in cooperation with other entities disclosed herein.

At block 502, a current location may be identified. This current location of the user device 110 may be determined by the user device 110 by a variety of mechanisms, including, for example, processing GNSS signals, such as time data from three or more GNSS satellites 240. Therefore, the current location may be determined from triangulating from the GNSS signals received by the user device 110 via antenna 226. The location may further be identified using sensors 304, such as accelerometers (e.g. MEMS-based accelerometers), individually or in conjunction with GNSS signals to identify the location of the user device. These sensor 304 information may particularly be used in situations where the user device 110 and the GNSS antenna 226 thereon may not be in line-of-site, and therefore may not be receiving direct GNSS signals, form one or more GNSS satellites 240. In yet further alternatives, the user device 110 may be configured to determine its location by triangulation using signals received from more than one mobile communications infrastructure 120.

At block 504, the current location may be transmitted to the mobile network server(s) as an encrypted location message via the mobile communication network. In other words, the location message may carry the current location (e.g. location coordinates, name of a place, etc.). The location message may further carry one or more other information, such as an identity of the user 210 associated with the user device 110 and/or the identity of the user device 110. The location message may then be encrypted. In the case of a GSM mobile communication network, a SIM card may be utilized for the purposes of encryption of the location message. It will further be appreciated that in some alternative embodiments, the location message may not be encrypted.

At block 506, it may be determined if an association message is received from the mobile network servers. The association message may be received responsive to transmitting the current location message by the processes of block 504. In some cases, an association message may be received form the mobile network server(s) 250 if it is determined by the mobile network server(s) 250 that the user device 110 is within range of a WiFi network and one or more WiFi APs 130 associated therewith. If an association message is not received at block 506, then the method 500 may return to block 502 to repeat the process of determining a new current location and transmitting the same as part of a location message, such as an encrypted location message. This location message, at block 502, may be transmitted by the user device 110 and the processors 300 thereon intermittently, such as at a predetermined frequency, a user selected frequency, and/or a mobile communication network selected frequency to the one or more mobile network server(s) 250 associated with the mobile communications network provider or a third party source. In some alternate example embodiments, a location message may be generated based at least in part on the current location of the user device 110 if a movement of the user device 110 is detected, such as a movement greater than a predetermined threshold level. This movement may be detected by the processors 300 based at least in part on signal(s) from sensors 304, such as an accelerometer disposed on the user device 110, or GNSS signals.

If at block 506 an association message is received, then the method 500 may proceed to block 508, where the association message may be decrypted. The association message may be decrypted by any suitable mechanism. In some cases, decryption keys and/or algorithms associated with a SIM card of the user device 110, particularly in the case where the mobile communications network is a GSM network, may be utilized for the purposes of decryption. At block 510, WiFi association information may be identified based at least in part on the decrypted association message. The WiFi association information may be extracted by the processors 300 from the decrypted association message.

At block 512, the WiFi radio may be turned on and a connection may be established with the WiFi AP associated with the received association information. It will be appreciated that when the user device is not connected to a WiFi network, the WiFi radio or transceiver may be powered down or put in a low power state. This may be done to preserve battery life of the user device 110. When the user device 110 is to connect to the WiFi network, the WiFi transceiver may be energized or in other words powered up from a low power or standby state. It will be appreciated that in some example embodiments, the WiFi radio may not be turned off while the user device is disconnected form a WiFi network. In these cases, the processes of block 512 may be optional.

At block 514, open applications on the user device may be provided with communications bandwidth via the WiFi AP. In other words, once the user device 110 connects to the WiFi network of the WiFi AP 130, the user device 110 may be configured to transfer the communication bandwidth needs of some or all of the applications and/or software running thereon from the mobile communications network to the WiFi network.

At block 516, it may be determined if sufficient communication bandwidth is available via the WiFi AP connection. If it is determined that there is sufficient communication bandwidth available via the WiFi AP 130, then the method 500 may, at block 514, continue to provide communications bandwidth to application running thereon via the WiFi AP 130 and the WiFi network associated therewith. If however, it is determined at block 516 that the sufficient communications bandwidth is not available, then the method 500 may proceed to block 518, where open applications on the user device may be provided with communications bandwidth via connection with the mobile communications network. Therefore, if the user device 110 and the processors 300 thereon determine that it is no longer within the radio range 132 of the WiFi AP 130 or will not be imminently, then it may transfer the communication bandwidth needs of some or all of the applications and/or software running thereon from the WiFi network back to the mobile communications network. The user device 110 may still further be configured to resume intermittently transmitting its location as a location message to the mobile network servers 120. At this point, if all applications are drawing communications bandwidth from the mobile communications network, then the user device 110 and the processors 300 thereon may optionally turn of the WiFi radio 306 or place the radio in a low power state to preserve power and/or battery life of the user device 110.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Figure 6:
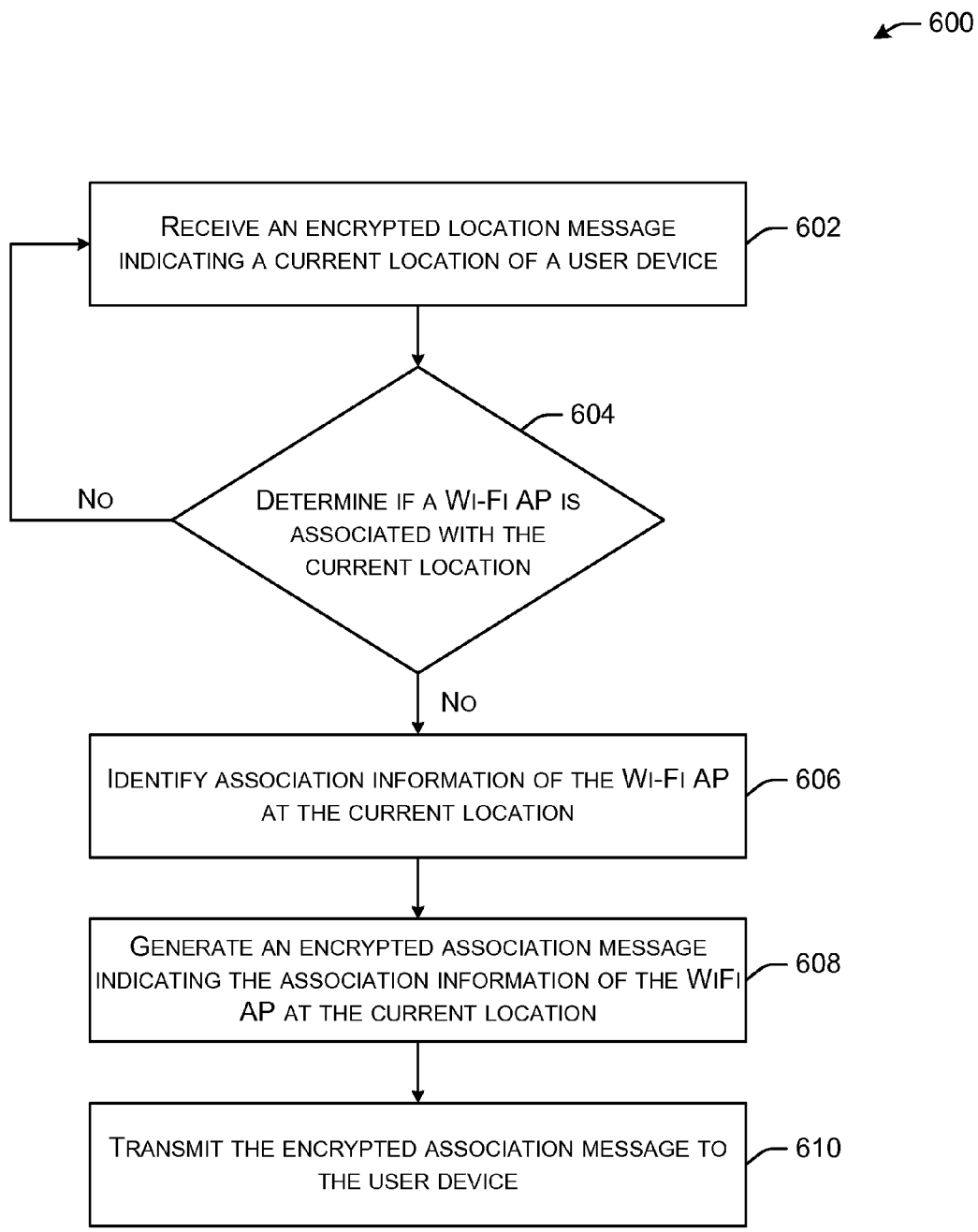
FIG. 6 is a flow diagram illustrating an example method for providing WiFi association credentials to a user device based at least in part on a received current location of the user device, in accordance with certain example embodiments of the disclosure.

FIG. 6 is a flow diagram illustrating an example method 600 for reconstructing one or more wireless signals detected and/or received by at least one wireless network device 130, in accordance with certain example embodiments of the disclosure. The method 600 may be performed by mobile network server(s) and the processors 400 thereon, in cooperation with one or more other entities.

At block 602, an encrypted location message indicating a current location of a user device may be received. This location message may be generated by the user device according to the processes of block 502 of method 500 of FIG. 5. The location message may be received via the mobile communication network. It will be appreciated that in some alternative cases, the location message may not be encrypted.

At block 604, it may be determined if a WiFi AP is associated with the current location. If there is no WiFi AP 130 in the current location of the user device 110 to which the user device 110 may connect, then the method 600 may return to block 602 to receive the next indication of current location form the user device 110. If however, at block 604, it is determined that there is a WiFi AP 130 available to which the user device 110 may connect, then the method 600 may proceed to block 606, where association information of the WiFi AP at the current location may be identified.

At block 608, an encrypted association message indicating the association information of the WiFi AP at the current location may be generated. At block 610, the encrypted association message may be transmitted to the user device. The encrypted association message may be transmitted, in example embodiments, by the mobile communications network to the user device 110. It will be appreciated that in some example embodiments, the association message may be transmitted with out encryption.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

According to embodiments of the disclosure, there may be a method. The method may include identifying, by a user device comprising one or more computer processors, a location of the user device, transmitting, by the user device and via a mobile communications network, the location of the user device, receiving, by the user device and responsive to the location of the user device, one or more WiFi association information corresponding to a WiFi access point available at the location of the user device, and connecting, by the user device an based at least in part on the WiFi association information, to the WiFi access point. According to further example embodiments, transmitting the location of the user device further comprises generating, by the user device, a location message carrying the location of the user device and an identity of the user device. In still further example embodiments, generating the location message further comprises encrypting the location message. In yet further example embodiments, the method of the WiFi association information includes at least a service set identification (SSID) and a password of the WiFi access point. In example embodiments, the method further includes reducing, by the user device, use of communications bandwidth from the mobile communications network, and establishing, by the user device, use of communications bandwidth from a WiFi network associated with the WiFi access point. In still further example embodiments, reducing use of the communications bandwidth from the mobile communications network comprises transferring the communications bandwidth usage of an application being executed on the user device from the mobile communications network to the WiFi network. In yet further example embodiments, the method includes determining, by the user device at a point in time subsequent to connecting to the WiFi access point, that the user device is not within range of a WiFi network associated with the WiFi access point and increasing, responsive to the determination by the user device, the use of communications bandwidth from the mobile communications network by transferring the communications bandwidth usage of the application from the WiFi network to the mobile communications network. In example embodiments of the disclosure, there may be a system for performing the aforementioned methods.

In example embodiments of the disclosure, there may be one or more computer-readable media comprising computer-executable instructions that, when executed by one or more processors, configure the one or more processors to perform a method comprising identifying a location of the user device, transmitting, via a mobile communications network, an location message carrying the location of the user device receiving, responsive to the location message, WiFi association information corresponding to a WiFi network available at the location of the user device, and connecting, based at least in part on the WiFi association information, to the WiFi network. According to example embodiments, the one or more computer-readable media have WiFi association information that includes at least a service set identification (SSID) and a password of at least one WiFi access point associated with the WiFi network. According to further example embodiments, the method further comprises decrypting an association message carrying the WiFi association information corresponding to the available WiFi network. In still further example embodiments, the method further comprises reducing use of communications bandwidth from the mobile communications network, and using communications bandwidth from the WiFi network. In example embodiments, the method further comprises determining, at a point in time subsequent to connecting to the WiFi network, that a received signal strength indication (RSSI) is below a predetermined threshold, and increasing, responsive to the determination, the use of communications bandwidth from the mobile communications network by transferring the communications bandwidth usage of an application from the WiFi network to the mobile communications network. In further example embodiments, connecting to the WiFi access point further comprises the one or more processors to direct energizing a WiFi transceiver from a low-power state to a powered state.

Example embodiments, according to the disclosure may include a user device, comprising a first antenna communicatively coupled to a first transceiver and configured to receive or transmit one or more wireless signals associated with a mobile communications network, a second antenna communicatively coupled to a second transceiver and configured to receive or transmit one or more wireless signals associated with a WiFi network, and one or more processors configured to identify a location of the user device, transmit a signal indicating the identified location via the first transmitter and first antenna on the mobile communications network, receive association information via the first transmitter and first antenna on mobile communications network, and initiate connection to the WiFi network via the second antenna and second transceiver utilizing the association information. In example embodiments, the one or more processors are further configured to direct the energizing the second transceiver responsive to receiving the association information. In further example embodiments, the one or more processors are further configured to provide communications bandwidth to one or more applications from the WiFi network after connecting to the WiFi network. In still further example embodiments, the one or more processors are further configured to determine a received signal strength indication (RSSI) based on a signal received via the second antenna and second transceiver, determine that the RSSI is below a predetermined threshold level, provide, responsive to the determination that the RSSI is below the predetermined threshold, communications bandwidth to the one or more applications from the WiFi network after connecting to the WiFi network. According to example embodiments the user device includes a third antenna communicatively coupled to a third transceiver and configured to receive at least one global navigation satellite system (GNSS) signal and, wherein the one or more processors configured to identify a location of the user device further comprises the one or more processors configured to receive one or more GNSS signals via the third antenna and third transceiver, and determine the location of the user device based at least in part on the received one or more GNSS signals.

Example embodiments of the disclosure include an apparatus, comprising a means for identifying a location of the user device, a means for transmitting, via a mobile communications network, the location of the user device, a means for receiving, responsive to the location of the user device, one or more WiFi association information corresponding to a WiFi access point available at the location of the user device, and a means for connecting, based at least in part on the WiFi association information, to the WiFi access point. In example embodiments, the means for transmitting the location of the user device further comprises a means for generating a location message carrying the location of the user device and an identity of the user device. In still further example embodiments, the means for generating the location message further comprises a means for encrypting the location message. In yet further example embodiments, the WiFi association information includes at least a service set identification (SSID) and a password of the WiFi access point. In additional example embodiments, the apparatus further includes a means for reducing use of communications bandwidth from the mobile communications network, and a means for establishing use of communications bandwidth from a WiFi network associated with the WiFi access point. In still further example embodiments, the means for reducing use of the communications bandwidth from the mobile communications network comprises a means for transferring the communications bandwidth usage of an application being executed on the user device from the mobile communications network to the WiFi network. In yet further example embodiments, the apparatus further includes a means for determining, at a point in time subsequent to connecting to the WiFi access point, that the user device is not within range of a WiFi network associated with the WiFi access point, and a means for increasing, responsive to the determination, the use of communications bandwidth from the mobile communications network by transferring the communications bandwidth usage of the application from the WiFi network to the mobile communications network.

Example embodiments of the disclosure include, a system, comprising at least one memory that stores computer-executable instructions, and at least one processor configured to access the at least one memory, wherein the at least one processor is further configured to execute the computer-executable instructions to receive a location message from a user device, identify, based at least in part on the location message, that a current location corresponds to an available WiFi network, identify one or more association information associated with the available WiFi network, and initiate transmitting the one or more association information to the user device. In example embodiments, the processors are further configured to identify the current location by decrypting the location message. In further example embodiments, the at least one processor is configured to execute the computer-executable instructions to identify that the current location corresponds to an available WiFi network comprises accessing a datastore of WiFi infrastructure and their corresponding respective locations. In yet further example embodiments, the association information includes at least a service set identification (SSID) and a password of at least one WiFi access point associated with the available WiFi network.

Example embodiments include a method comprising receiving, by a mobile network server comprising one or more processors, a location message from a user device, identifying, by the mobile network server and based at least in part on the location message, that a current location corresponds to an available WiFi network, identifying, by the mobile network servers, one or more association information associated with the available WiFi network, and initiating, by the mobile network servers, transmitting the one or more association information to the user device. In example embodiments, the method may include identifying, by the mobile network servers, the current location by decrypting the location message. In still further example embodiments, the method may include executing, by the mobile network servers, the computer-executable instructions to identify that the current location corresponds to an available WiFi network comprises accessing a datastore of WiFi infrastructure and their corresponding respective locations. In example embodiments, the association information includes at least a service set identification (SSID) and a password of at least one WiFi access point associated with the available WiFi network.

Example embodiments include one or more computer-readable media comprising computer-executable instructions that, when executed by one or more processors, configure the one or more processors to perform a method comprising receiving a location message from a user device identifying, based at least in part on the location message, that a current location corresponds to an available WiFi network, identifying one or more association information associated with the available WiFi network, and initiating transmitting the one or more association information to the user device. In further example embodiments, the method further comprises identifying the current location by decrypting the location message. In still further example embodiments, the method further comprises accessing a datastore of WiFi infrastructure and their corresponding respective locations. In still further example embodiments, the association information includes at least a service set identification (SSID) and a password of at least one WiFi access point associated with the available WiFi network.

Example embodiments may include an apparatus, comprising a means for receiving a location message from a user device, a means for identifying, based at least in part on the location message, that a current location corresponds to an available WiFi network, a means for identifying one or more association information associated with the available WiFi network, and a means for initiating transmitting the one or more association information to the user device. In example embodiments, the apparatus further comprises a means for identifying the current location by decrypting the location message. In further example embodiments, the apparatus further comprises a means for accessing a datastore of WiFi infrastructure and their corresponding respective locations. In still further example embodiments, the association information includes at least a service set identification (SSID) and a password of at least one WiFi access point associated with the available WiFi network.

The claimed invention is:

1. A method, comprising:
   identifying, by a user device comprising one or more computer processors, a location of the user device;
   transmitting, by the user device and via a mobile communications network, the location of the user device;
   receiving, by the user device and responsive to the location of the user device, one or more WiFi association information corresponding to a WiFi access point available at the location of the user device;
   connecting, by the user device and based at least in part on the WiFi association information, to the WiFi access point;
   identifying, by the user device, an application being executed by the one or more computer processors;
   transferring, by the user device, the application from using communications bandwidth from the mobile communications network to using communications bandwidth from a wireless network associated with the WiFi access point;
   determine a received signal strength indication (RSSI) using a signal received;
   determine that the RSSI is below a threshold level; and
   provide communications bandwidth to the application from the mobile communications network.

2. The method of claim 1, wherein transmitting the location of the user device further comprises generating, by the user device, a location message carrying the location of the user device and an identity of the user device.

3. The method of claim 2, wherein the generating the location message further comprises encrypting the location message.

4. The method of claim 1, wherein the WiFi association information includes at least a service set identification (SSID) and a password of the WiFi access point.

5. The method of claim 1, further comprising:
   reducing, by the user device and based at least in part on connecting to the WiFi access point, use of the communications bandwidth from the mobile communications network.

6. The method of claim 5, wherein the application is a first application and wherein reducing use of the communications bandwidth from the mobile communications network further comprises executing a second application on the one or more computer processors using the communications bandwidth of the WiFi network.

7. The method of claim 1, further comprising:
determining, by the user device at a point in time subsequent to connecting to the WiFi access point, that the user device is not within range of a WiFi network associated with the WiFi access point; and
increasing, responsive to the determination by the user device, the use of communications bandwidth from the mobile communications network by transferring the communications bandwidth usage of the application from the WiFi network to the mobile communications network.

8. One or more computer-readable media comprising computer-executable instructions that, when executed by one or more processors, configure the one or more processors to perform a method comprising:
identifying a location of a user device;
transmitting, via a mobile communications network, a location message carrying the location of the user device;
receiving, responsive to the location message, WiFi association information corresponding to a WiFi network available at the location of the user device;
connecting, based at least in part on the WiFi association information, to the WiFi network;
identifying an application being executed by the one or more processors; and
transferring the application from using communications bandwidth from the mobile communications network to using communications bandwidth from a wireless network associated with a WiFi access point;
determine a received signal strength indication (RSSI) using a signal received;
determine that the RSSI is below a threshold level; and
provide communications bandwidth to the application from the mobile communications network.

9. The one or more computer-readable media of claim 8, wherein the WiFi association information includes at least a service set identification (SSID) and a password of at least one WiFi access point associated with the WiFi network.

10. The one or more computer-readable media of claim 8, wherein the method further comprises:
decrypting an association message carrying the WiFi association information corresponding to the available WiFi network.

11. The one or more computer-readable media of claim 8, wherein the method further comprises:
reducing, based at least in part on connecting to the WiFi network, use of communications bandwidth from the mobile communications network.

12. The one or more computer-readable media of claim 11, wherein the method further comprises:
determining, at a point in time subsequent to connecting to the WiFi network, that a received signal strength indication (RSSI) is below a predetermined threshold; and
increasing, responsive to the determination, the use of communications bandwidth from the mobile communications network by transferring the communications bandwidth usage of the application from the WiFi network to the mobile communications network.

13. The one or more computer-readable media of claim 12, wherein connecting to the WiFi access point further comprises the one or more processors to direct energizing a WiFi transceiver from a low-power state to a powered state.

14. A user device, comprising:
a first antenna communicatively coupled to a first transceiver and configured to receive or transmit one or more wireless signals associated with a mobile communications network;
a second antenna communicatively coupled to a second transceiver and configured to receive or transmit one or more wireless signals associated with a WiFi network; and
one or more processors configured to:
identify a location of the user device;
transmit a signal indicating the identified location via the first transceiver and first antenna via the mobile communications network;
receive association information via the first transceiver and first antenna via the mobile communications network;
initiate connection to the WiFi network via the second antenna and second transceiver utilizing the association information;
identify an application being executed by the one or more processors;
transfer the application from using communications bandwidth from the mobile communications network to using communications bandwidth from the WiFi network;
determine a received signal strength indication (RSSI) using a signal received;
determine that the RSSI is below a threshold level; and
provide communications bandwidth to the application from the mobile communications network.

15. The user device of claim 14, wherein the one or more processors are further configured to:
direct energizing the second transceiver responsive to receiving the association information.

16. The user device of claim 14, wherein the application is a first application and wherein the one or more processors are further configured to:
execute a second application and provide communications bandwidth to the second application from the WiFi network after connecting to the WiFi network.

17. The user device of claim 14, further comprising:
a third antenna communicatively coupled to a third transceiver and configured to receive at least one global navigation satellite system (GNSS) signal and, wherein the one or more processors configured to identify a location of the user device further comprises the one or more processors configured to:
receive one or more GNSS signals via the third antenna and third transceiver; and
determine the location of the user device based at least in part on the received one or more GNSS signals.

18. A system, comprising:
at least one memory that stores computer-executable instructions; and
at least one processor configured to access the at least one memory, wherein the at least one processor is further configured to execute the computer-executable instructions to:
receive a message indicating information associated with an access point of a WiFi network, wherein the information includes a location of the access point and one or more association information associated with the WiFi network;
update a datastore of WiFi infrastructure with the information associated with the access point of the WiFi network;

receive a location message from a user device, the location message indicating a current location associated with the user device;

identify, based at least in part on the location message and the datastore, that the current location corresponds to the access point;

identify, based at least in part on the datastore, the one or more association information associated with the WiFi network; and transmit the one or more association information to the user device.

19. The system of claim 18, wherein the processors are further configured to identify the current location by decrypting the location message.

20. The system of claim 18, wherein the at least one processor is configured to execute the computer-executable instructions to identify that the current location corresponds to an available WiFi network comprises accessing a datastore of WiFi infrastructure and their corresponding respective locations.

21. The system of claim 18, wherein the association information includes at least a service set identification (SSID) and a password of at least one WiFi access point associated with the available WiFi network.

* * * * *